United States Patent [19]
Burkle et al.

[11] 3,780,995
[45] Dec. 25, 1973

[54] FEEDING ATTACHMENT FOR MACHINE PROCESSING FOAMABLE PLASTIC MATERIALS

[75] Inventors: Erwin Burkle, Benediktbeuren; Felix Loebe, Munich, both of Germany

[73] Assignee: Krauss-Maffel Aktiengesellschaft, Munich, Germany

[22] Filed: Nov. 1, 1971

[21] Appl. No.: 194,656

[30] Foreign Application Priority Data
Oct. 31, 1970 Germany.................. P 20 53 646.3

[52] U.S. Cl. .............................................. 259/193
[51] Int. Cl................................................. B01f 7/08
[58] Field of Search................... 259/191, 192, 193, 259/9, 10, 25, 26

[56] References Cited
UNITED STATES PATENTS
3,310,836   3/1967   Nichols............................. 259/191
3,371,379   3/1968   Reifenhauser.................... 259/191
3,535,737   10/1970  Hendry............................. 259/191
3,593,379   7/1971   Hendry............................. 259/191

*Primary Examiner*—Robert W. Jenkins
*Attorney*—Karl F. Ross

[57] ABSTRACT

An attachment for a molding machine, serving to prepare an injectable mass including a propellant, has a plasticizing screw which feeds a mass of liquefied plastic material to a narrow peripheral gap between a rotating mixing head and a housing. One or more passages, connected to a source or propellant, open generally radially into this gap to admix the propellant with the plastic mass in a region in which this mass forms a thin layer moving perpendicularly to these passages.

27 Claims, 7 Drawing Figures

FIG.1

Erwin Bürkle
Felix Loebe
INVENTORS.

BY
Karl F. Ross
Attorney

Erwin Bürkle
Felix Loebe
INVENTORS.

BY
Karl F. Ross
Attorney

Erwin Bürkle
Felix Loebe
INVENTORS.

FEEDING ATTACHMENT FOR MACHINE PROCESSING FOAMABLE PLASTIC MATERIALS

Our present invention relates to a device for preparing a moldable plastic mass, including a propellant, to be used for the manufacture of articles of foam plastic.

It is known to liquefy and masticate moldable material, introduced in solid (e.g. granular) form through a hopper into a feed channel, with the aid of a rotating feed screw whose threads advance the material toward an orifice, e.g., for extrusion molding or for introduction into a mold cavity of an injection-molding machine. If the article to be molded is to have a cellular structure, a propellant or expanding agent is introduced into a downstream portion of the feed channel, usually through an axial passage in the feed screw, care being taken to prevent the propellant from working its way backward through the upstream channel portion toward the hopper through which it could escape into the atmosphere. On the other hand, the passage or passages serving for the admission of the propellant into the feed channel must not be obstructed by the advancing plastic mass, a requirement which has heretofore led to considerable difficulties in designing a mixing attachment for delivering expandable plastic material to an extruder or a molding machine.

The general object of our invention, therefore, is to provide an improved device for effectively commingling liquefied plastic material and propellant under pressure in a feed channel leading toward an outlet orifice, with uniform distribution of the propellant throughout the mixture and with avoidance of both leakage and obstruction.

Pursuant to our present invention, this object is realized by the provision, in a downstream portion of the feed channel, of a narrow mixing gap which is traversed by the liquefied plastic material under heat and pressure. The stream of plastic material, in flowing through that gap, forms a thin layer into which the propellant is injected, continuously or intermittently, through one or more passages terminating at the gap generally perpendicularly thereto. The thin layer or ribbon of plastic material, flowing past the propellant-injection passage or passages, thus has substantially no force component tending to drive it into these passages so that no obstruction results. At the same time, the gaseous or liquid propellant stream penetrates this thin layer and becomes thoroughly mixed with the liquefied plastic, particularly if there is relative motion between the surfaces defining the gap. For this purpose we prefer to design the mixing element as a generally cylindrical insert radially spaced from the surrounding channel walls which define therewith an annular clearance constitutes the aforementioned gap, this insert being advantageously rotatable about the axis of the downstream channel portion in which it is located.

The injection passage or passages for the propellant may extend to this annular gap from within the insert and/or through the surrounding housing part. If they lie within the insert, its rotation relative to the housing promotes uniform distribution of the propellant throughout the flow of plastic material. Homogenization can be further enhanced by providing the rotatable insert and/or the surrounding channel wall with axially extending flutes which are peripherally spaced in an area beyond the junction of the gap with the injection passage or passages.

Advantageously, the peripheral surface of the insert diverges frustoconically toward the outlet orifice in the area of the gap which may be of substantially constant effective cross-section throughout its length.

This rotating insert may be made integral with the feed and plasticizing screw forcing the liquefied material through the upstream channel portion or may be driven independently of that screw. In the latter case, the insert may be used as the body of a check valve biased by a spring force toward a frustoconical seat and defining the annular gap with that seat upon separating therefrom, either in response to the feed pressure or under the control of a periodically operating mechanism synchronized with the mold-closing phase of an associated injection-molding machine.

In either case, we prefer to slow the advance of the mass immediately downstream of the mixing gap by the inter-position of flow-restricting means between the gap-forming insert and the outlet. Such flow-restricting means may be designed as one or more stationary perforated disks in which a gudgeon or steel shaft rigid with the insert may be rotatably journaled; alternatively, or in addition, the flow may be throttled by a set of peripherally spaced teeth or crenellations on a downstream extension of the insert, these teeth advantageously lying on a helicoidal curve whose pitch is so chosen with reference to the sense of rotation of the insert as to oppose the advance of the mass toward the outlet. The insert may also have a forward extension provided with screw threads which help feed the plastic material into the mixing gap and which, if that insert is integral with a plasticizing screw, may have a pitch substantially less than that of the threads of that screw.

If the propellant is led to the gap through one or more passages in the rotating insert itself, it may be supplied by way of a tube passing with clearance through an axial bore of an elongate extension of the insert, the tube terminating in a coupling head threaded into a socket of the insert. In order to shield the oncoming propellant from the heat of the surrounding plastic flow, conduits clustered about the supply tube may serve for the circulation of a cooling fluid through its coupling head.

The above and other features of our invention are described in detail hereinafter with reference to the accompanying drawing in which.

Figure 1:
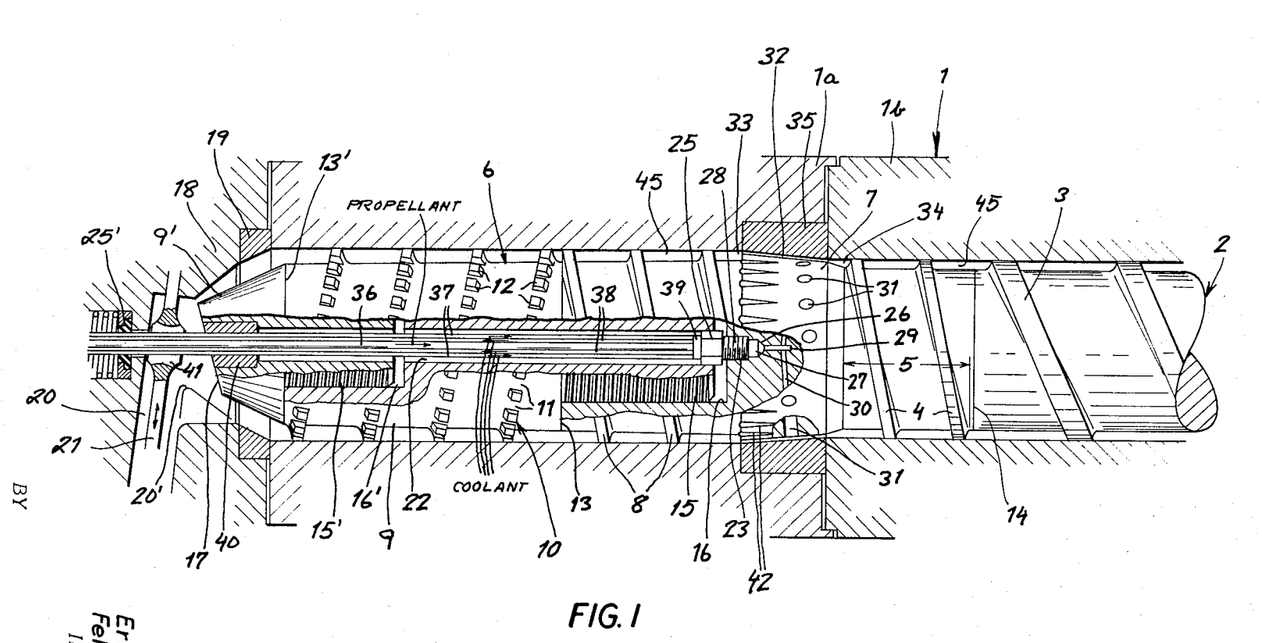
FIG. 1 is a view in axial section of a feeding attachment according to our invention associated with an injection-molding machine.

In FIG. 1 we have shown a mixing device, designed as an attachment for a molding machine not further illustrated, which comprises a heated housing 1 split into two portions 1a, 1b that are separably interconnected to facilitate the insertion and removal of a generally cylindrical insert 2, serving as a plasticizing and mixing member, rotatably lodged in a cylindrical channel 45 of the housing. The upstream portion of member 2, shown only in part and extending from a nonillustrated hopper, is formed with screw threads 3 of relatively large pitch, indicated at 5, and with several further turns of thread 4 of about half that pitch, the two differently threaded sections adjoining each other at 14. The downstream portion 6 of this member has screw threads 8 which are of the same pitch as threads 4 and are separated therefrom by a frustoconical head 7 defining a narrow annular gap 32 of constant width with a surrounding ring 35 clamped between housing parts 1a and 1b.

Gap 32 communicates with helical peripheral grooves 33, 34 defined by the turns 8 and 4 downstream and upstream of head 7. The core 9 of the downstream portion 6 of the rotatable insert 2 progressively diminishes in diameter toward a frustoconical tip 9' which has a beveled end face 17 confronting a constriction 20' in a nozzle housing 18 secured to housing 1; channel 20 communicates with an injection chamber of the molding machine by way of an orifice equipped with a check valve having a spring-loaded stem 21 slidably mounted in the nozzle housing. An arrangement of this general type has been illustrated in FIG. 3 discussed hereinafter.

The central section of insert portion 6 may be detachably joined, at 13 and 13', to its forward section, carrying the threads 8, and its frustoconical rear section 9' with the aid of bosses 15, 15' threaded into bores 16, 16', the screw threads of these bosses being of such pitch as to oppose separation of the sections when the member 2 is rotated by a nonillustrated drive motor at its upstream end. This central section is provided with a set of peripheral teeth or crenellations 12, separated by voids 11, which are part of a discontinuous screw thread 10 whose pitch is opposite that of turns 4 and 8. This discontinuous thread, therefore, constitutes a helix opposing the advance of the fluid mass driven from right to left by the threads 3, 4 and 8, the voids 11 forming throttled passages through which the mass can reach the outlet 20 but which increase its compression in the region just beyond gap 32. A similar area of congestion exists ahead of that gap in the region of the low-pitch threads 4 which slow down the flow of plastic material coming from the nonillustrated hopper. This regional densification prevents the rearward escape of propellant, introduced into the gap 32 via generally radial passages 30 extending within head 7 at right angles to its frustoconical surface, and insures thorough intermingling of the propellant with the plastic mass beyond the gap. This intermingling is further enhanced by the provision of axially extending, peripherally spaced flutes 42 of semicircular or semielliptical cross-section which are generally drop-shaped and diverge in the direction of flow, these flutes being confined to a part of the frustoconical surface downstream of passages 30 whose radially outer ends are broadened into discharge nozzles 31.

Passages 30 originate at a blind axial bore 29 of head 7 which broadens into a threaded socket 28 receiving a coupling head 25 provided with mating screw threads 23, the coupling head has a conical tip 27 which rests tightly against a complementary seat 26 in the socket. Head 25 is carried at the end of a tube 36 projecting, together with a cluster of surrounding outer and inner conduits 37 and 38, through an eye 41 of valve stem 21 from nozzle housing 18, in which it is rotatably journaled by means of a packing 25, and through an axial bore 22 of insert portion 6. The outer tubes 37 and the inner tubes 38, which are transversely interconnected by a manifold 39 near coupling head 25, carry a cooling fluid toward and away from that head to prevent overheating of the propellant in tube 36 by thermal radiation from the hot plastic mass in the surrounding flow path 33. Tubes 36-38 are further supported in rear section 9' by a bushing 40.

An annular adapter 19 in the entrance end of nozzle housing 18 directs the flow into the outlet 20 past the beveled end face 17 whose wobbling motion, similar to that of a swash plate, exerts a further masticating effect upon the mixture of plastic material and propellant.

Tubes 36-38 are connected within nozzle housing 18, by means of conventional rotary distributors not shown, to a non-illustrated pump system which supplies the propellant and circulates the cooling fluid.

The removably clamped annular inserts 19 and 35 may be replaced by rings of different shape to fit a variety of mixing heads 7 and agitators 9'.

Tube 36 communicates directly with the central bore 28 of coupling head 25 and its extension 29 joined to passages 30. The discharge ends 31 of the peripherally spaced passages 30 may be relatively staggered in axial direction so as to sweep different zones of the annular gap 32. This enables the introduction of propellant into the plastic mass at a considerably faster rate than would be possible with stationary conduits. The propellant is introduced in an area of high but diminishing feeding pressure which favors its uniform distribution throughout the mass. If denied, this propellant could also be supplied through a central bore from the upstream end of member 2, especially if the downstream portion 6 of that member is considerably longer than its upstream portion.

Figure 2:
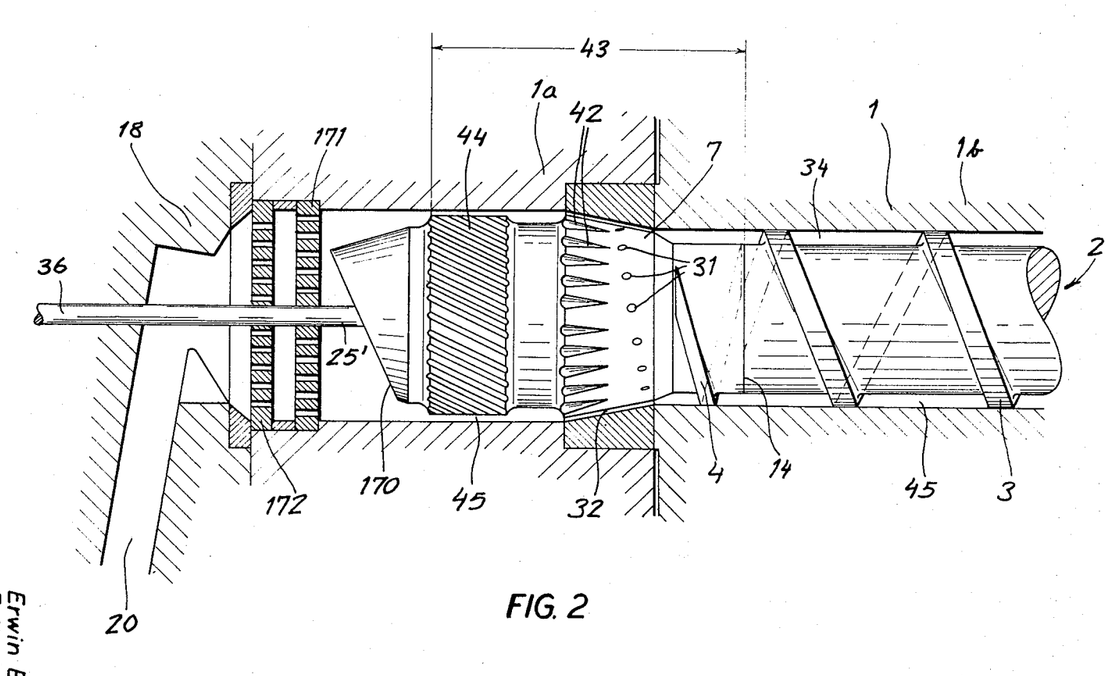
FIG. 2 is a view similar to FIG. 1 but drawn to a larger scale and showing certain modifications.

In FIG. 2 we have shown a generally similar arrangement in which analogous elements have been designated by the same reference numerals. The mixing portion 43 of the rotatable feeding and plasticizing member 2 is considerably shorter than the corresponding portion 6 of FIG. 1 so that, if desired, the cooling circuit 37,38 of FIG. 1 may be omitted. The plastic mass issuing from gap 32 is forced past an array of helicoidal peripheral teeth 44 of long lay and, after advancing beyond the beveled downstream end 170 of member 2, must traverse two stationary disks 171, 172 with relatively staggered apertures before reaching the outlet 20. Other elements not shown in FIG. 2, such as the check valve with stem 21 at the end of outlet 20, may of course also be utilized in this case.

Our invention may also be realized in a system in which the rotatable insert, serving as a mixing head, is no longer integral with the feed screw but forms part of the check valve which controls the admission of the masticated and homogenized mass to a load. Thus, the liquefied plastic material is delivered in FIG. 3 through an input channel 54 in a heated housing 51 by a feed and plasticizing screw 52 whose downstream end terminates in a beveled face 53. An output channel 55 extends, generally at right angles to input channel 54, within a flange 56 of a cylinder 68 which defines an injection orifice 71, provided with an entrance cone 72, for a conventional molding machine not further illustrated. Orifice 71 communicates through an injection chamber 69 with a cylinder 70 containing a reciprocable piston 73 which periodically, in synchronism with the mold-closing mechanism of the machine, discharges the compressed mass from chamber 69 after the unblocking of the orifice outlet as is known per se. Chamber 69 has an inlet 67 which forms an extension of channel 55 and is separated therefrom by an enlarged valve chamber 62 defined by a cup-shaped liner 61. This chamber 62 forms a part of a valve 57 including a valve seat with a frustoconical surface complementary to an upstream portion 60 of a rotatable head 86 on a valve stem 58 which extends across the agitator face 53 in substantially the same manner as the stem 21 of FIG. 1 with reference to face 17. Stem 58, to which rotary motion (arrow A) is imparted by a nonillustrated drive motor, is axially displaceable (arrow B) against the force of a loading spring 63 in a spring housing 64 threaded into flange 56. An extension 59 of stem 58, below head 86, is rotatably journaled in a flow-restricting disk 65 which is clamped between housing 68 and liner 61 and which has perforations 66 forming throttled passages for the plastic mass delivered by feed screw 52.

Figure 4:
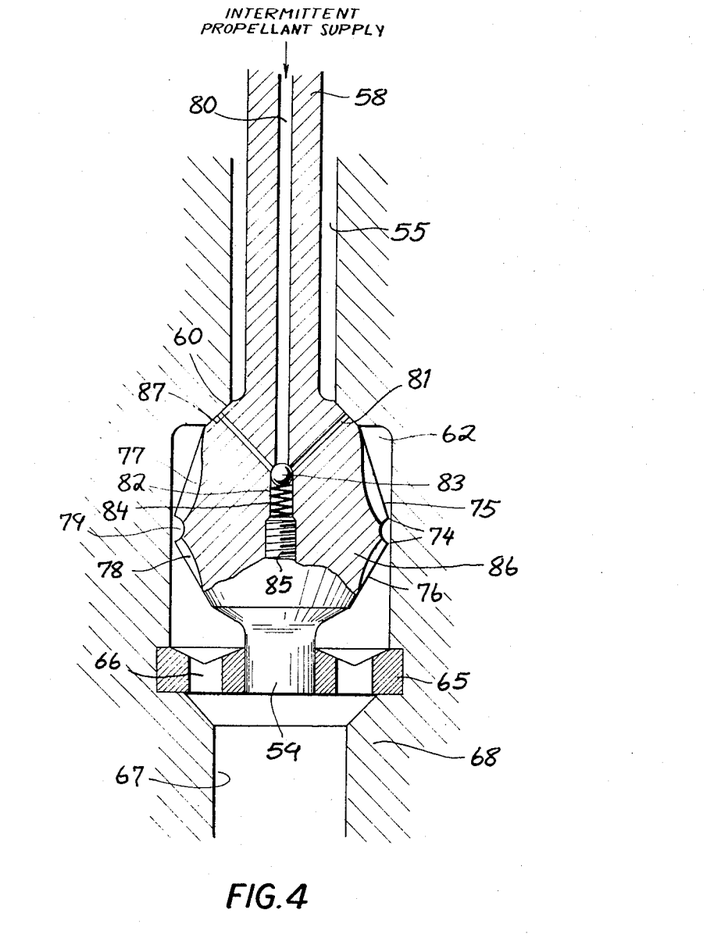
FIG. 4 is a view similar to FIG. 3 showing part of the assembly thereof on a larger scale and in somewhat modified form.

Biasing spring 63 may be so calibrated as to yield to a certain supply pressure, developed in channel 55, to open the valve 57 so that surface 60 of valve body 86 is lifted off its seat to form therewith a narrow clearance as indicated in dot-dash lines at 87 in FIG. 4. The width of that clearance, constituting a mixing gap similar to gap 32 of FIGS. 1 and 2, may be limited by the disk 65 contacting the lower end of body 86 or by other stops not shown. If necessary, a nonillustrated mechanism synchronized with the mold movement may periodically open the valve 57 by depressing the stem 58 against the force of spring 63.

Figure 3:
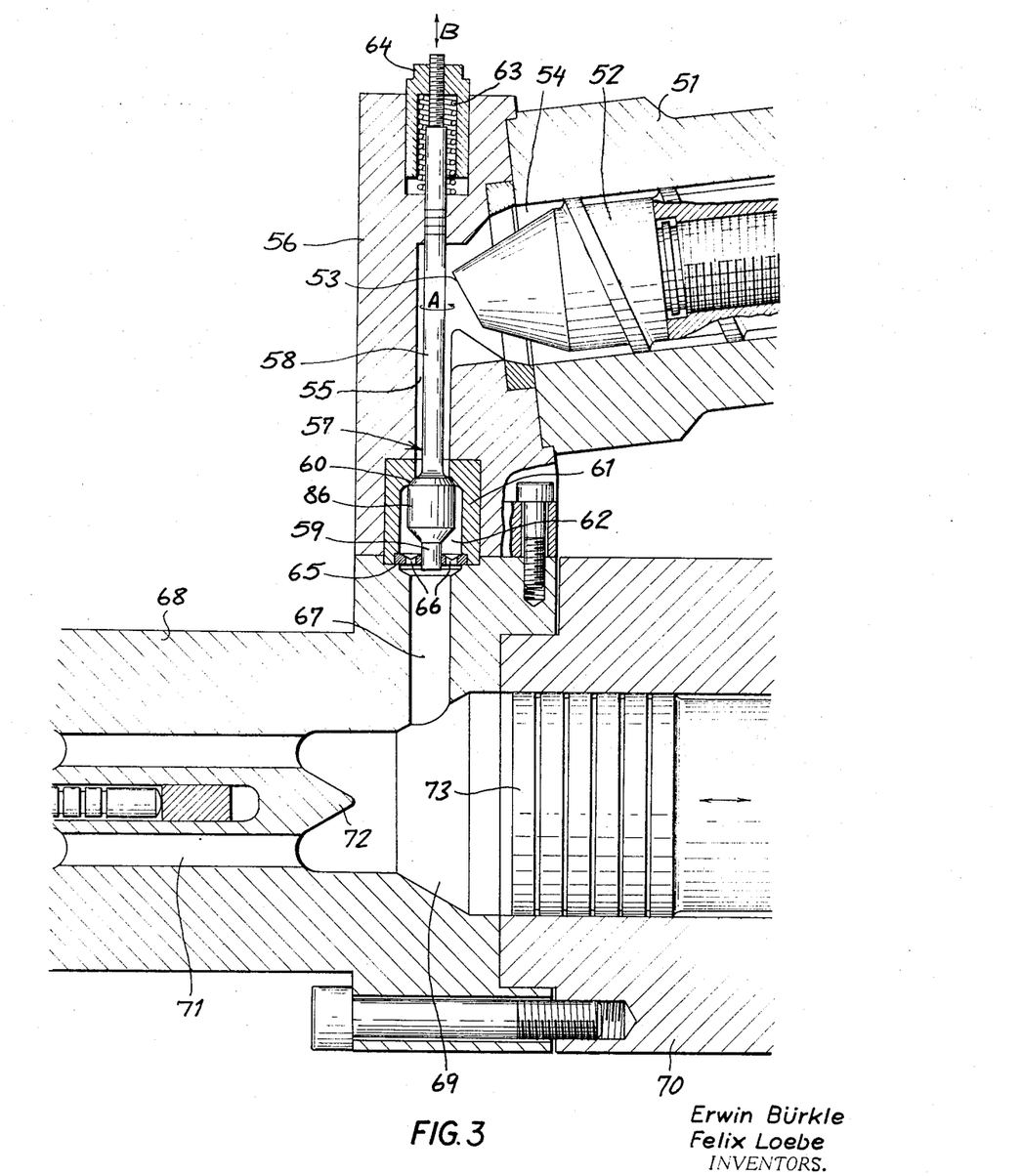
FIG. 3 is an axial sectional view of another embodiment of our invention.

The valve body 86, whose central portion is shown to be cylindrical in FIG. 3, advantageously has the shape illustrated in FIG. 4 which is that of a double frustocone having a zone 74 of maximum diameter which has an annular peripheral groove 79 so as to define two further constricted passages downstream of gap 87 between the valve body and the surrounding linear or housing wall. The two frustoconical portions 75 and 76 are peripherally fluted at 77 and 78, in a manner generally similar to that illustrated at 42 in FIGS. 1 and 2, for the purpose of intensified homogenization.

Propellant is admitted to the gap 87 through a central bore 80 of stem 58 having an enlarged extension 82 in which a ball 83 is urged upwardly against a seat by a spring 84 adjustably held in place by a threaded block 85. In its illustrated position of closure, ball 82 blocks the bore 80 as well as a number of lateral branches 81 (only two shown) which radiate therefrom so as to communicate with the gap 87 when the body 86 is lowered. Passages 81 may again be relatively staggered in axial direction, as shown and described for nozzles 31 of FIGS. 1 and 2, to distribute the propellant throughout the thin film of plastic mass traversing the gap 87; again, these passages are substantially perpendicular to the generatrices of the frustoconical gap surfaces so that the propellant discharged therefrom will readily penetrate the flow, this orientation also avoiding any danger that the discharge ends of these passages might be obstructed by the mass.

If desired, drop-shaped recesses similar to the flutes 77 and 78 (of semicircular or semielliptical cross-section) could also be provided in the inner wall of the stationary liner 61 or the housing 56 bounding the chamber 62.

Figure 5:
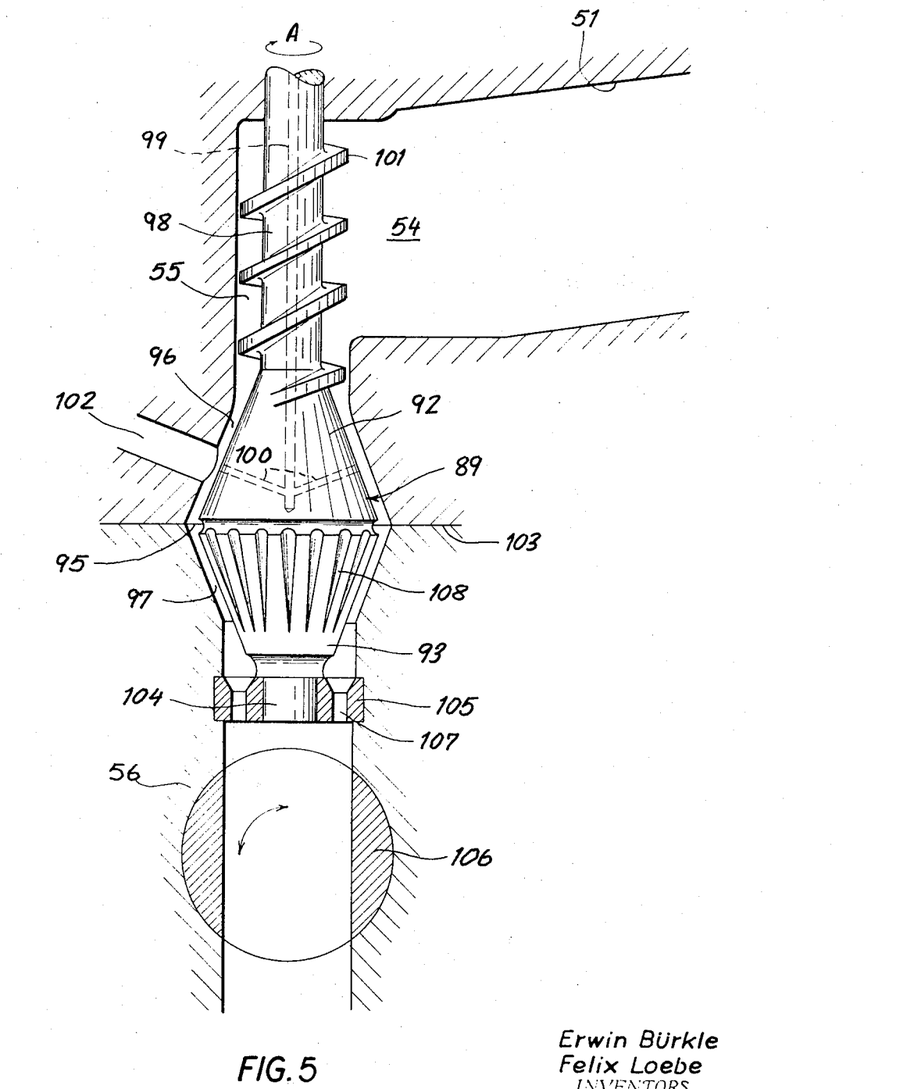
FIGS. 5–7 are views similar to FIG. 4, illustrating further modifications.

FIG. 5 shows a similar arrangement wherein, however, the gap-forming insert in channel 55 is a dual frustocone 89 whose upstream and downstream portions 92, 93 are joined at a zone of maximum diameter provided with a peripheral groove 94; the housing structure 56 of this attachment is split into two parts along a transverse plane 103 in line with groove 94.

Insert 89, rotating about its axis as indicated by arrow A, is axially fixed in this embodiment and does not operate as a check valve. Instead, a shut-off valve 106 rotatable through 90°, under the control of non-illustrated means synchronized with the mold motion and the injection piston, is disposed downstream of a chamber 95 in which two annular gaps 96 and 97 are defined by the frustocones 92, 93 and the associated housing parts. Propellant may again be supplied through a central bore 99, with radial branch passages 100 which may be axially staggered as discussed above, with or without a pressure-responsive valve of adjustable threshold such as the one shown at 83 – 85 in FIG. 4. The downstream portion 93 is formed with peripheral flutes 108 similar to those described above.

The stem 98 of insert 89 may be provided with screw threads 101, which supplement the feeding action of the plasticizing screw in channel 54 (omitted in FIG. 5) to help drive the fluid mass through the gap 96 and a stationary disk 105 with restricted apertures 107 forming a journal bearing for a gudgeon 104 of the insert. As further illustrated in FIG. 5, the propellant passages 100 within the rotating mixing head 92 may be supplemented (or replaced) by external conduits 102 of similar orientation (i.e. substantially perpendicular to the cone generatrices) leading to the diverging gap 96 through the wall of housing 56.

With the gap 96, 97 permanently open, the flow of the mass through channel 55 is intermittently blocked in FIG. 5 by a shut-off valve 106 downstream of throttling disk 105. Valve 106 may be periodically rotated through 90°, by a mechanism in step with the mold motion and the piston reciprocation, to admit the compressed mixture to the injection chamber 69 shown in FIG. 3.

Figure 6:
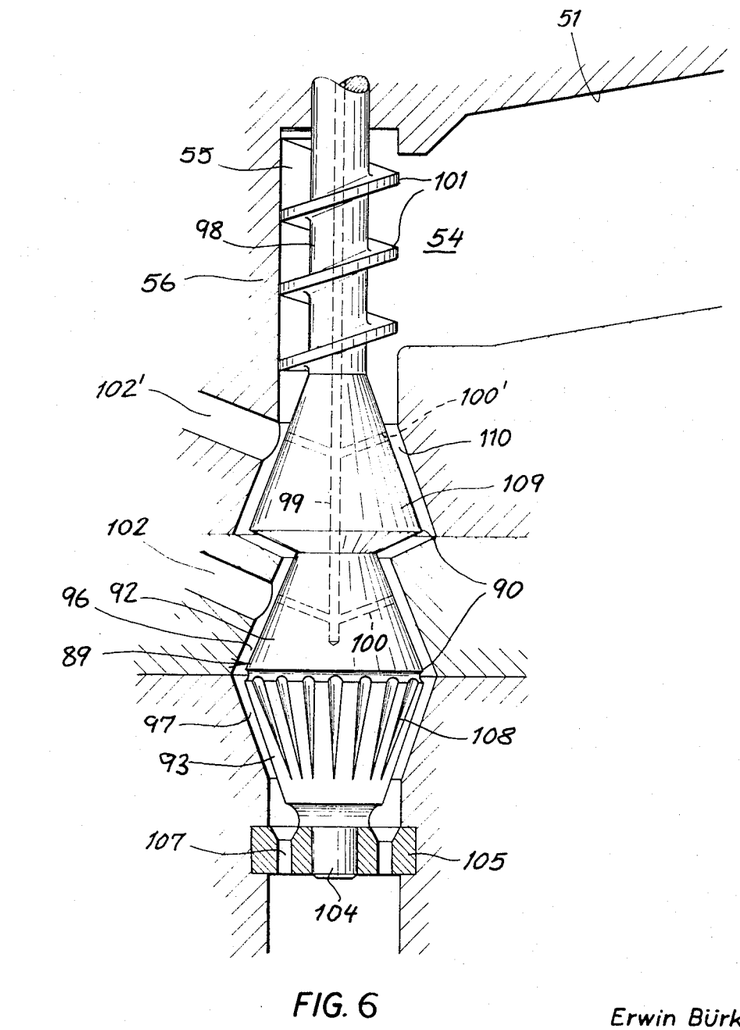

In the modified system of FIG. 6 we have shown a rotatable insert 90 with a head 98, as illustrated in FIG. 5, preceded by another head 92, also shaped as a double frustocone, whose downstream portion has an obtuse vertex angle in contradistinction to the acute vertex angle of its upstream portion. Head 109 defines with the surrounding housing wall (or with the liner 61 shown in FIG. 3) an annular clearance 100, the combined gap 110, 96, 97 representing a constricted annular channel portion of serrated profile and of substantially constant effective cross-section throughout its length whereby the flow velocity in that gap undergoes practically no change. Central passage 99, delivering the propellant through stem 98, has a set of upstream branches 100' in head 109 opening perpendicularly into clearance 109, as do one or more outer conduits 102' in housing 56. Stem 98 may again carry a set of peripheral screw threads 101, of a pitch substantially less than that of the main feed screw 52 (FIG. 3), to help drive the mass through the zig-zagging mixing gap. A shutoff valve 106 (FIG. 5) or its equivalent may be inserted, as before, in the flow path beyond throttling disk 105. Ancillary head 92 could also be fluted, downstream of passages 100' and 102', in the general manner shown at 77, 78 in FIG. 4.

Figure 7:
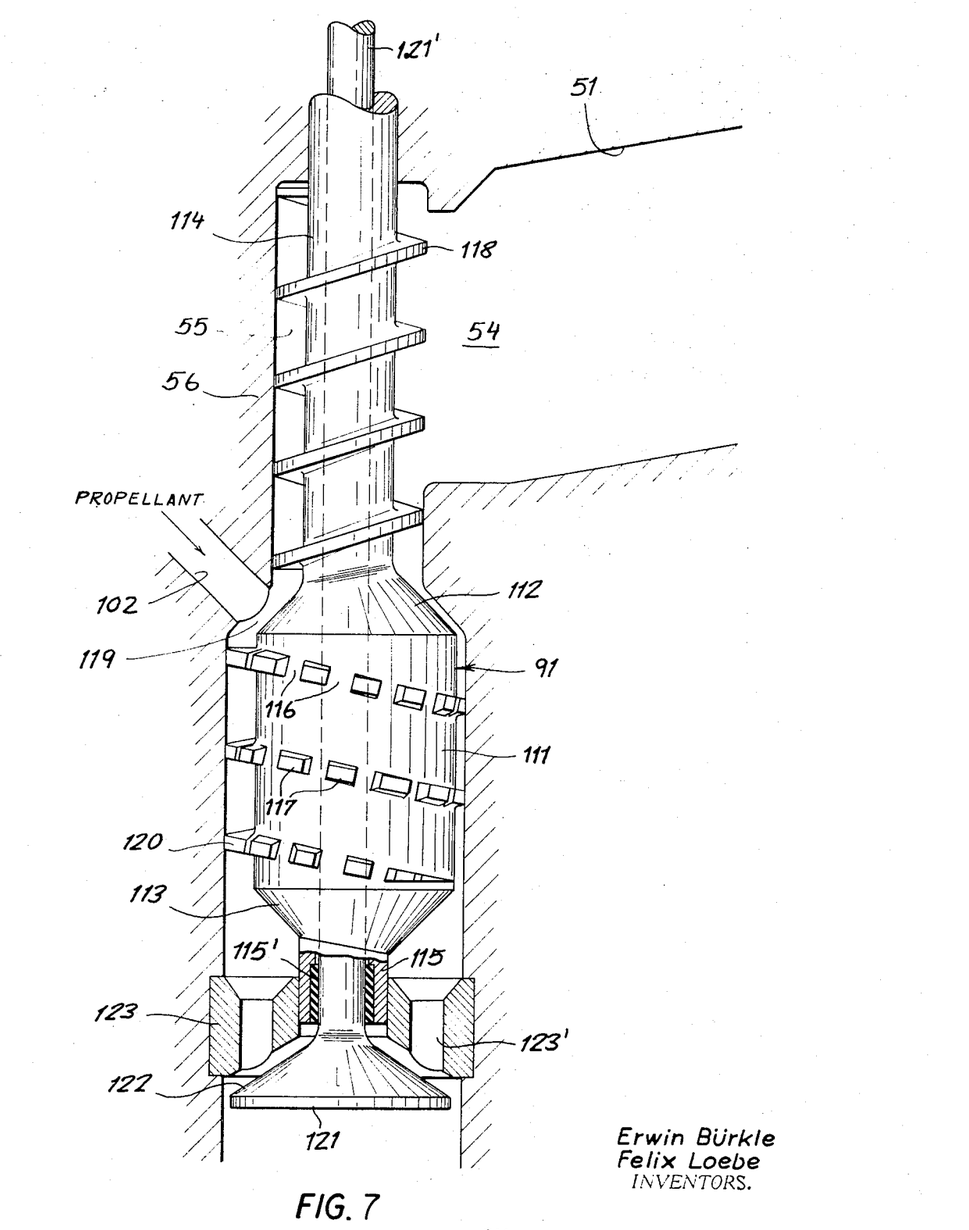

FIG. 7 shows, in a system of the same basic type as that of FIGS. 3 – 6, a mixing head 91 inserted in a cylindrical channel portion to define therewith a gap 119, this head being connected on its upstream side through a frustoconical neck 112 with a rotatably journaled stem 114 while terminating on its downstream side in a frustoconical end portion 113 rigid with a trunnion 115. The tubular stem 114 is axially traversed by a rod 121', rigid with a valve body 121, which is biased upwardly by a spring not shown (similar to spring 63 of FIG. 3) to urge the frustoconical front surface 122 of valve body 121 into contact with a mating seat on the underside of a throttling disk 123 similar to disk 105 of the preceding embodiment. Trunnion 115 is internally lined with a packing 115' forming a fluidtight bearing for stem 121'. In its raised position, from which body 121 may be periodically dislodged by a sufficiently high supply pressure or by a tripping mechanism as described above, this body blocks the flow through apertures 123' of disk 123 to the injection chamber therebeyond. In view of the presence of this check valve 121, 121', the propellant is admitted in this case exclusively through one or more external passages 102 terminating at gap 119.

Stem 114, which is centered on the axis of rotation of head 91, bears screw threads 118 resembling the threads 101 of FIGS. 5 and 6. Head 91, however, has a cylindrical central portion 111 which is offset from that axis and carries crenellations 117, separated by voids 116, which are similar to the peripherally spaced teeth 12 of FIG. 1 and form part of a discontinuous helix 120 serving to generate a back pressure in the flow channel 55 as described above. To compensate for the eccentricity of the screw core 111, these crenellations vary in height so as to approach close to the inner peripheral chamber wall all around the axis of rotation, their outer surfaces being equidistant from that axis. Thus, the width of the gap 119 continuously varies at a location confronting a given injection passage 102 so that the propellant admitted therethrough penetrates to different depths for a thorough intermingling with the polymeric material.

The mixing head 91 shown in FIG. 7 could, of course, also be used without the check valve 121, 121' which may be replaced, for example, by a simple two-way valve 106 as shown in FIG. 5; in such case the propellant, or a part thereof, may again be supplied through an axial bore of the stem 114.

The rotatable inserts of FIGS. 3 - 7 are advantageously driven at speeds that are variable in a continuous manner to optimize the mixing action with different compositions. The crenellations 12, 117 may be arrayed, if desired, along a plurality of interleaved helicoidal curves or in planes transverse to the axis of rotation. These and other modifications, readily apparent to persons skilled in the art, are intended to be embraced within the spirit and scope of invention except as otherwise specified in the appended claims.

We claim:

1. A device for preparing a moldable plastic mass including a propellant, comprising:
    a housing forming a channel for supplying the moldable mass to an outlet;
    feed means in said housing for advancing liquefied plastic material under pressure through an upstream portion of said channel toward said outlet;
    mixing means in a downstream portion of said channel forming with said housing a narrow gap traversed by said plastic material in a thin layer; and
    propellant-injection means provided with at least one passage terminating at said gap generally perpendicularly thereto.

2. A device as defined in claim 1 wherein said mixing means comprises a generally cylindrical insert in said downstream portion radially spaced from the wall thereof to define therewith an annular clearance of substantially constant effective cross-section constituting said gap.

3. A device as defined in claim 2 wherein said insert is rotatable about the axis of said downstream portion.

4. A device as defined in claim 3 wherein the peripheral surface of said insert diverges generally frustoconically toward said outlet in the area of said gap.

5. A device as defined in claim 4 wherein said peripheral surface is provided with peripherally spaced, axially extending flutes in a region beyond said passage.

6. A device as defined in claim 5 wherein said peripheral surface is substantially in the shape of a double frustocone with a zone of maximum diameter downstream of said clearance.

7. A device as defined in claim 6 wherein said flutes are disposed at least in part on a converging portion of said insert downstream of said clearance.

8. A device as defined in claim 7 wherein said insert is provided in said zone of maximum diameter with a peripheral annular groove communicating with said flutes.

9. A device as defined in claim 3, further comprising flow-restricting means in said downstream portion between said insert and said outlet.

10. A device as defined in claim 9 wherein said flow-restricting means comprises a set of peripherally spaced teeth on a downstream extension of said insert.

11. A device as defined in claim 10 wherein said teeth are arrayed along a helicoidal curve with a pitch opposing the advance of the mass of plastic material and propellant toward said orifice during rotation of said insert.

12. A device as defined in claim 11 wherein said downstream extension has an eccentric cylindrical core bearing said teeth, the latter having outer surfaces equidistant from the axis of rotation of said insert.

13. A device as defined in claim 9 wherein said flow-restricting means comprises at least one perforated stationary disk.

14. A device as defined in claim 13 wherein said disk forms a journal bearing for said insert.

15. A device as defined in claim 3 wherein said insert has a downstream end provided with a beveled face.

16. A device as defined in claim 3 wherein said insert has an upstream extension for guiding said plastic material into said gap.

17. A device as defined in claim 16 wherein said extension has a head of generally frustoconical shape defining with said peripheral surface an outline of serrated profile, said channel being of substantially constant effective cross-section along said outline.

18. A device as defined in claim 16 wherein said extension is provided with peripheral screw threads for promoting the advance of said plastic material into said gap.

19. A device as defined in claim 18 wherein said feed means comprises a plasticizing screw integral with said insert.

20. A device as defined in claim 19 wherein the threads of said plasticizing screw are of greater pitch than those of said extension.

21. A device as defined in claim 3 wherein said channel forms a diverging valve seat forming said outlet, said insert being an axially displaceable valve body provided with biasing means urging same into contact with said valve seat and defining said annular clearance with said valve seat upon separation therefrom against the force of said biasing means.

22. A device as defined in claim 21 wherein said feed means comprises a plasticizing screw in a channel portion opening generally perpendicularly into said upstream portion.

23. A device as defined in claim 3 wherein said passage is disposed in said insert.

24. A device as defined in claim 23 wherein said passage terminates in several branches opening onto said gap at peripherally spaced and axially staggered locations.

25. A device as defined in claim 24 wherein said propellant-injection means comprises a fluid supply under intermittent pressure, said insert being provided with a pressure-responsive valve in said passage blocking said branches in the absence of an overriding supply pressure.

26. A device as defined in claim 23 wherein said insert has an elongate extension provided with an axial bore terminating at a socket in communication with said passage, said propellant-injection means comprising a tube axially traversing said bore with clearance and ending in a coupling received in said socket.

27. A device as defined in claim 26, further comprising cooling conduits clustered about said tube for shielding said propellant against thermal radiation from the surrounding plastic material.

* * * * *